United States Patent [19]
Gentert

[11] 3,898,757
[45] Aug. 12, 1975

[54] SPINNING LURE
[76] Inventor: Donald Gentert, 2419 W. Fifth St., Hastings, Nebr. 68901
[22] Filed: Jan. 25, 1974
[21] Appl. No.: 436,618

[52] U.S. Cl. ............... 43/42.06; 43/42.31; 43/42.5
[51] Int. Cl.² ......................................... A01K 85/00
[58] Field of Search .............. 43/42.06, 42.31, 42.5

[56] References Cited
UNITED STATES PATENTS

| | | | |
|---|---|---|---|
| 2,043,001 | 6/1936 | Lambrecht | 43/42.5 |
| 3,305,964 | 2/1967 | Wieszeck | 43/42.06 X |
| 3,403,469 | 10/1968 | Whitney | 43/42.06 |

*Primary Examiner*—Louis G. Mancene
*Assistant Examiner*—Daniel J. Leach

[57] ABSTRACT

A fish lure is formed of two small teaspoon-like parts which are placed back to back and secured with the backs of their bowls and the ends of their handles in contact with each other, leaving an open space between the intermediate parts of the handles. The hooks are secured to the ends of the bowls of the spoons, and the line is secured to the ends of the handles. The open space creates a fluttering sound while the lure is being trolled through the water.

1 Claim, 3 Drawing Figures

PATENTED AUG 12 1975　　3,898,757

SPINNING LURE

BACKGROUND OF THE INVENTION

1. Field of the Invention

The invention relates to a spinning lure for fishing.

2. The Prior Art

Various types of spinning lures have been suggested in the past, some of them formed of parts which are twisted with respect to each other longitudinally.

SUMMARY OF THE INVENTION

The present invention relates to an improved fishing lure of the spinning type, which has the form of two small teaspoon-like members secured with the backs of their bowls in contact with each other and the ends of the handles in contact, the handles being bent as in a conventional teaspoon so that a space is provided between them running from the bowls to the ends of the handles. The bowls diverge from each other, and the hooks, preferably triple hooks, are pivotally attached to the tips of the bowls. The line is secured to the connected ends of the handles.

BRIEF DESCRIPTION OF THE DRAWINGS

The invention will be more apparent from the accompanying drawings, in which.

DESCRIPTION OF THE PREFERRED EMBODIMENT

Figure 1:
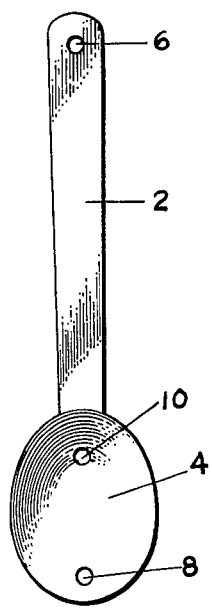
FIG. 1 shows in side elevation a spoon which forms one part of the complete device.
Figure 2:
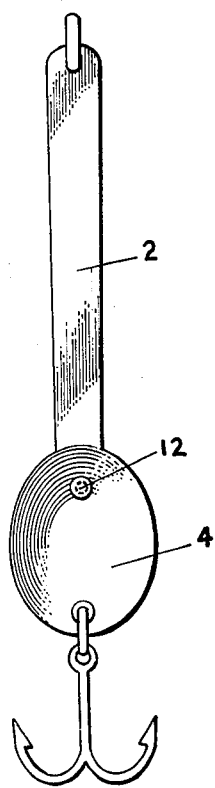
FIG. 2 shows the completed device in side view.
Figure 3:
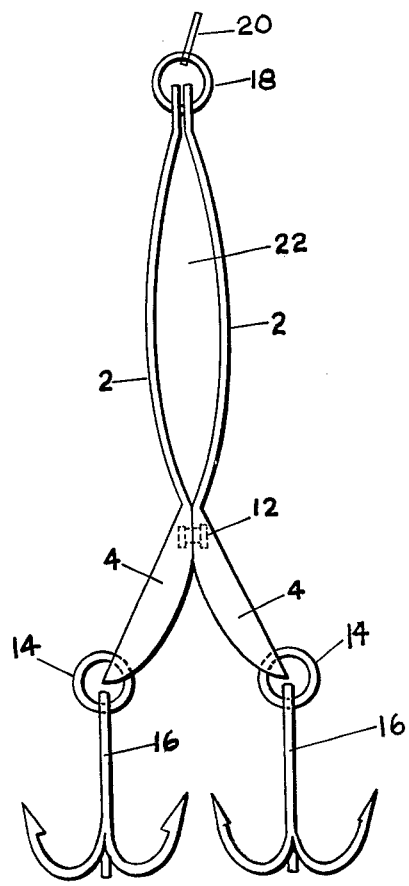
FIG. 3 is a view of the device at right angles to FIG. 2.

Referring to the drawings, the device is formed of two spoon-shaped objects having handle portions 2 and bowls 4. These are provided each with a hole 6 at the end of the handle, a hole 8 near the tip of the bowl and a hole 10 near the base of the bowl. The two are assembled back to back as shown in FIG. 3, with the bases of the bowls in contact with each other and the upper ends of the handles adjacent each other, and are secured together by a rivet 12 passing through the holes 10 in the two spoons. The holes 8 provide for receiving rings 14 on which triple hooks 16 are carried. The holes 6 provide for a ring 18, to which a line 20 can be attached.

Thus there is provided, because of the bending of the handle portions 2, a space 22.

The device thus includes a pair of teaspoon-shaped members; that is, members each having a handle and a shallow concave bowl at one end of the handle, the handles being curved so that they will be spaced from each other in their intermediate portions when the objects are placed with the bowls back to back.

There are hooks attached to the tips of the bowls of each of the spoons, and a line-receiving device is provided at the free end of the handles.

The handles are elongated; that is, they are of substantially greater length than width. The handles are also of less width than the width of the bowls.

The fact that the bowls are placed back to back and riveted together means that each tip slants outwardly from the central plane of the device, which gives a good spinning action and also provides room to place a triple hook on each end which assures the catching of a fish which strikes. The open space 22 creates a fluttering sound while the lure is being trolled through the water.

The lure has proven very effective for fishing for white bass, and also some rainbow trout have been caught with it.

I claim:

1. A fishing lure having a longitudinal center plane and comprising a pair of teaspoon-shaped objects on opposite sides of the center plane and having relatively shallow bowls and having handles each extending from one end of the bowls and curved outwardly from the center plane to provide an open space between the intermediate parts of the handles, the bowls being attached to the handles at points of attachment and being sloped outwardly from said points of attachment with respect to such center plane, means securing the bowls together at the ends adjacent the handles, back to back, the bowls having means adjacent their tips to carry hooks and the handles having means adjacent their ends remote from the bowls to receive a line.

* * * * *